Jan. 2, 1945.  C. W. KELSEY  2,366,624
TINE ASSEMBLY
Filed Dec. 23, 1941   3 Sheets-Sheet 1

INVENTOR.
Cadwallader W. Kelsey
BY
ATTORNEYS

Jan. 2, 1945.    C. W. KELSEY    2,366,624
TINE ASSEMBLY
Filed Dec. 23, 1941    3 Sheets-Sheet 2
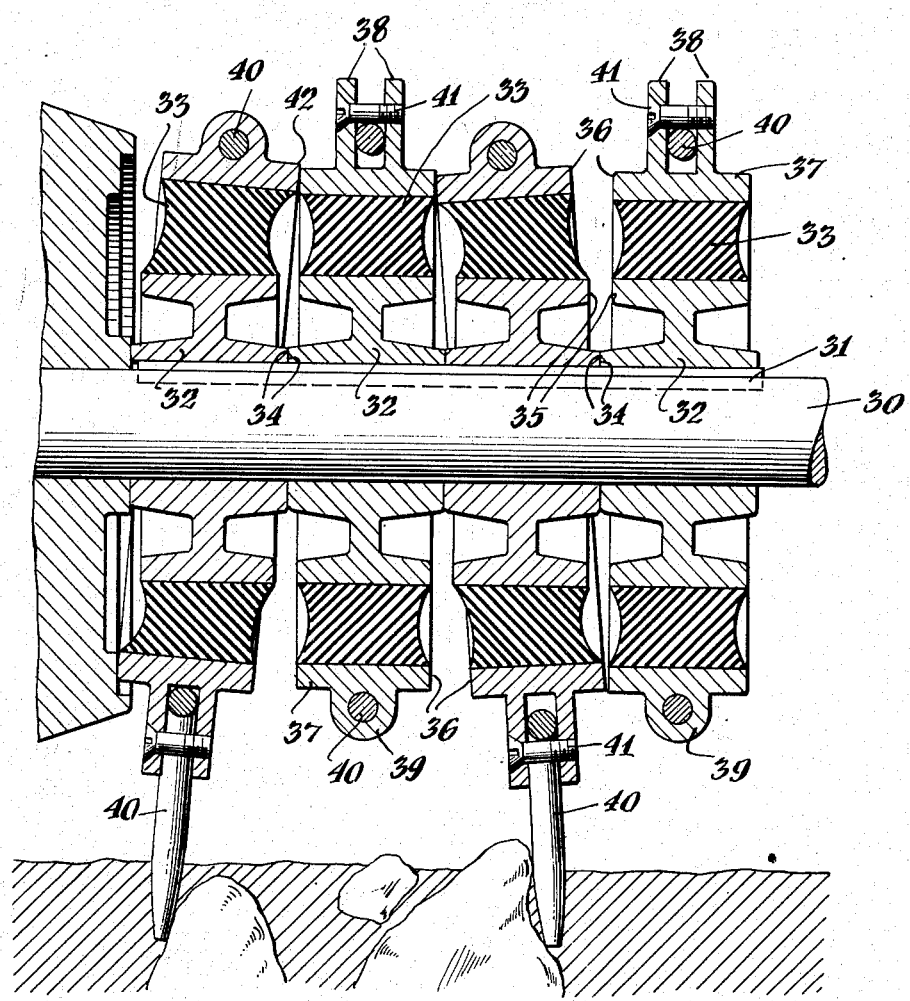
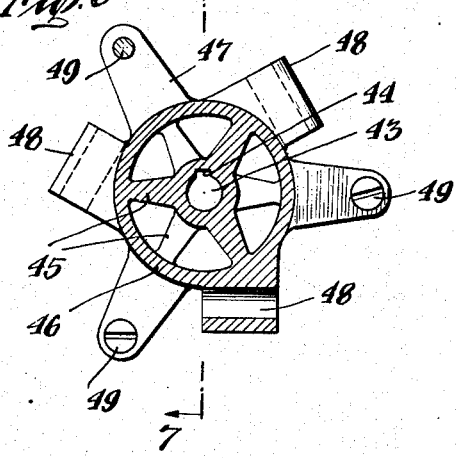
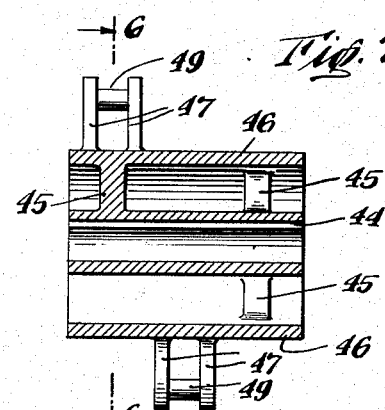
INVENTOR.
Cadwallader W. Kelsey
ATTORNEYS

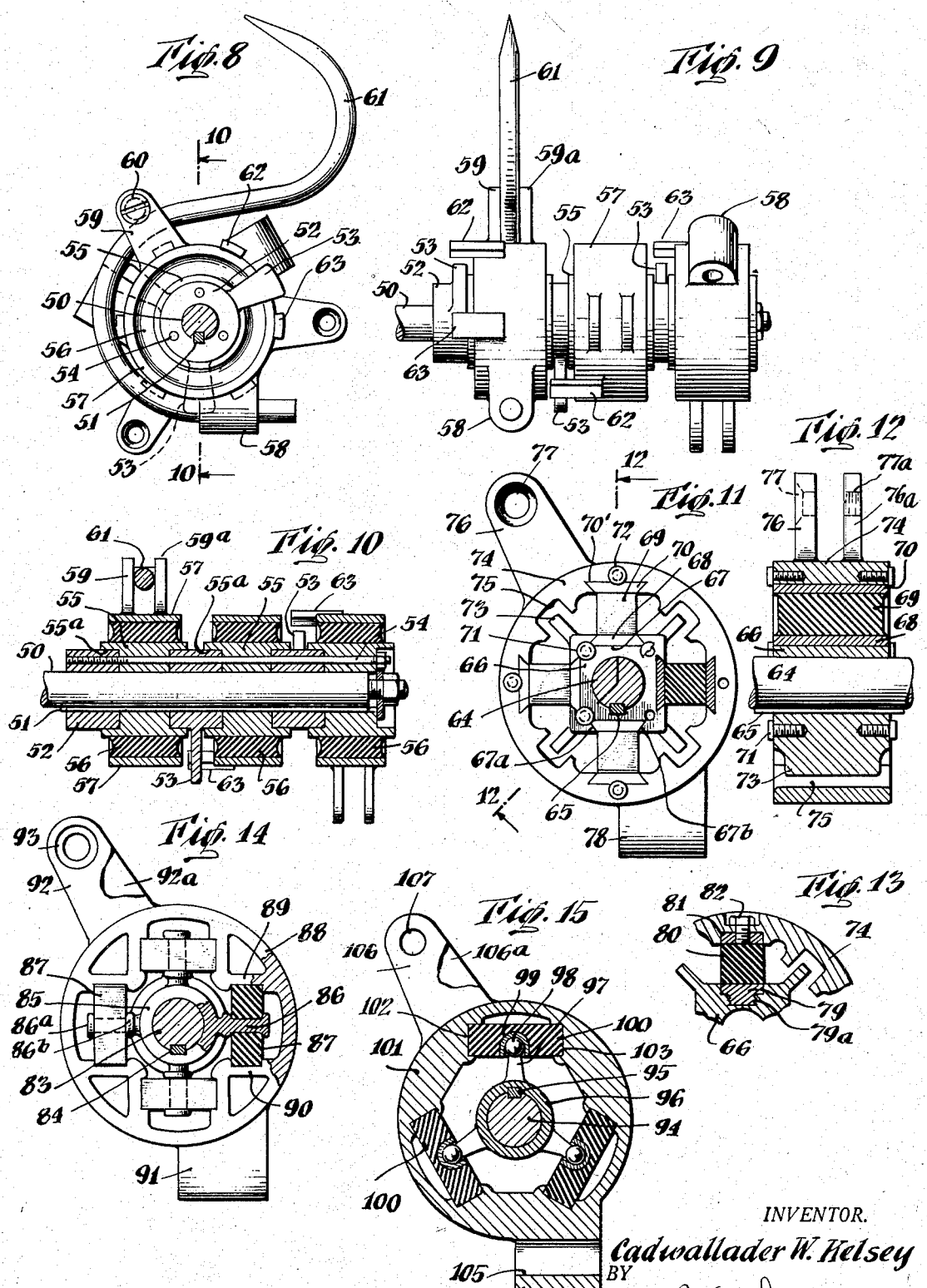

Patented Jan. 2, 1945

2,366,624

UNITED STATES PATENT OFFICE 2,366,624

TINE ASSEMBLY

Cadwallader W. Kelsey, Troy, N. Y., assignor to Rototiller, Inc., Troy, N. Y., a corporation of Delaware Application December 23, 1941, Serial No. 424,101

5 Claims. (Cl. 97—216)

This invention relates to improved tine assemblies and the like, as well as methods of mounting the same for use in rotary tillage machines. Heretofore, a great difficulty has been experienced with both tine and spring breakage resulting from shock and impact of the tines while rotating through the soil. Various cushioning devices, spring mounts and the like have been devised to absorb such shock or reduce it below a dangerous level, with varying degrees of success. However, all such expedients have been expensive, cumbersome, and so complicated that in addition to breakage and distortions, they are in themselves too costly.

In the present invention, a departure from previous practice is resorted to, in that the tine itself incorporates resilient design and serves as a spring or shock absorbing means. Such tines may be used in combination with a resilient holder where conditions are severe or with a solid holder under normal tillage conditions. Accordingly, it is an object of the invention to provide a tine assembly in which the tines are so mounted on a rotating drive shaft that the application of undue strain or sudden impact to their free ends is in part absorbed in the tine itself.

Another object is that of providing a tine assembly in which the area of surfaces passing through the soil at no time materially exceed the cutting edges of the tines themselves, thus eliminating the drag and resistance heretofore experienced in earlier designs.

A further object is that of providing a tine assembly which is materially lighter in construction than the type now in use. Thus, greatly facilitating the ease with which the entire assembly is lifted over obstacles that cannot be surmounted in any other fashion.

Another object is to provide a design whereby when encountering such conditions as must cause failure, the tine itself will fail, thus forming a positive insurance against damage to other parts of the mechanism. The tines are inexpensive and easily and quickly replaceable, thus a special saving in the cost of operation under severe conditions is assured.

A still further object is that of providing unit tine mounts which when grouped together in a completed assembly, not only provide for shock resistance received by the tine in the direction of the path of travel of the same, but also incident to sidewise reflection of said tines.

Still another object is that of providing a structure in certain modifications of which the resilient members which are preferably formed of rubber or the like may be readily interchangeable and replaceable in the advent of damage and which individual tine assembly units can be assembled along a driven shaft so as to increase or decrease the width of the row under cultivation.

With these and other objects in mind, reference is had to the attached sheets of drawings, in which:

Fig. 5 is a cross sectional view of a modified form of the tine assembly embodying my invention;

Fig. 6 is a cross section of a still further form of tine assembly embodying my invention;

Fig. 7 is a cross section taken along the lines 7—7 of Fig. 6 looking in the direction of the arrows;

Fig. 8 is a plan view in side elevation of a further modification of my invention;

Fig. 9 is a plan view in front elevation of the modification shown in Fig. 8;

Fig. 10 is a cross section taken along the line 10—10 of Fig. 8 looking in the direction of the arrows;

Fig. 11 is a side elevation in plan of a still further form of my invention;

Fig. 12 is a cross sectional view taken along the line 12—12 of Fig. 11 looking in the direction of the arrows;

Fig. 13 is a fragmentary sectional view of the form shown in Figs. 11 and 12 and with a slightly modified resilient insert;

Fig. 14 is an elevation in plan of another type of tine assembly utilizing my invention partially broken away in cross section to reveal a detail of assembling the resilient rubber block in position; and Fig. 15 is a side elevation in cross section of still another form of my invention.

Figure 1:
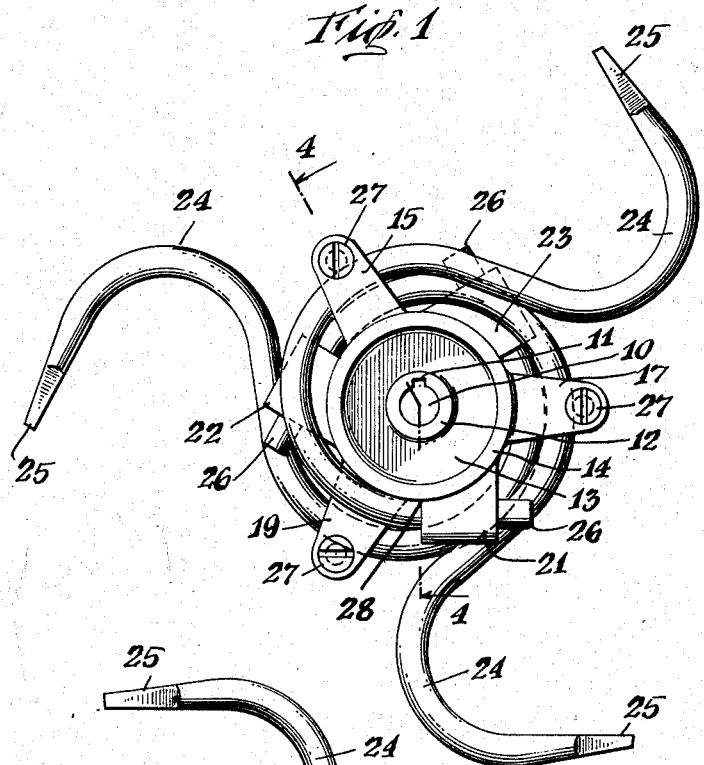
Fig. 1 represents a side elevation of a tine assembly showing one embodiment of my improved tine members.
Figure 2:
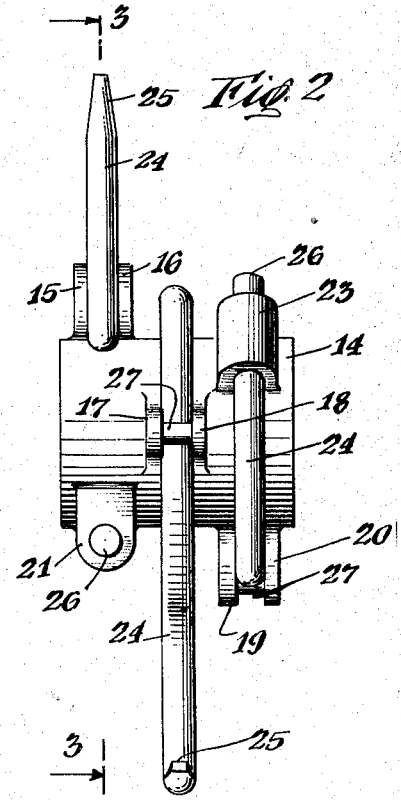
Fig. 2 is an end elevation of the assembly shown in Fig. 1.

Referring now primarily to Figs. 1 through 4, there is shown at 10, the drive shaft of a rotary tillage machine. This drive shaft may be coupled to any suitable source of power, as for example, to a portable internal combustion engine and is rotated at speeds subject to the control of the operator. Keyed to said shaft, by means for example, of the key 11, is a sleeve 12 to which in turn is bonded by well known means, a rubber tube or sleeve 13. Beyond this latter sleeve is a still further tube or sleeve member 14 formed of steel or other suitable material and again in turn bonded to the rubber sleeve. Extending radially from said outer sleeve are projecting spaced lug or finger members 15 and 16 and, if desired, said pairs of members may be repeated in axial spacing from one another, as at 17, and 18, 19 and 20. Also, extending radially from said outer sleeve and in line with each pair of lug or finger members are socket members which are shown, as for example, at 21, 22 and 23. Cooperating with said socket members and said lug or finger members, are tines 24 which, as has been illustrated, are provided with soil treating end portions 25 of any desirable shape. Each of said tines is preferably shaped generally as shown in the form of an S curve. The radius of the inner S bend of said tine is slightly greater than the radius of the outer sleeve 14. The inner end 26 of each tine opposite the working end 25 is placed in position in its respective socket member 21 and the tine pushed home so that the inner convolution of the tine rides against the outer surface of the sleeve 14, at the point 28. From this point the tine curves about the outer surface of the sleeve 14 and because of its greater radius, its distance from the said sleeve surface gradually increases as the tine extends away from the socket 21 until the point where it passes between the lugs 15 and 16. At this point, a clevis pin or bolt 27 is used to hold the tine against accidental displacement. It will be noted that the clevis pin or bolt 27 engages the tine at a point just short of its greatest diameter and measured from the socket end 26, and thus withdrawal is prevented until the clevis pin or bolt is removed.

Figure 3:
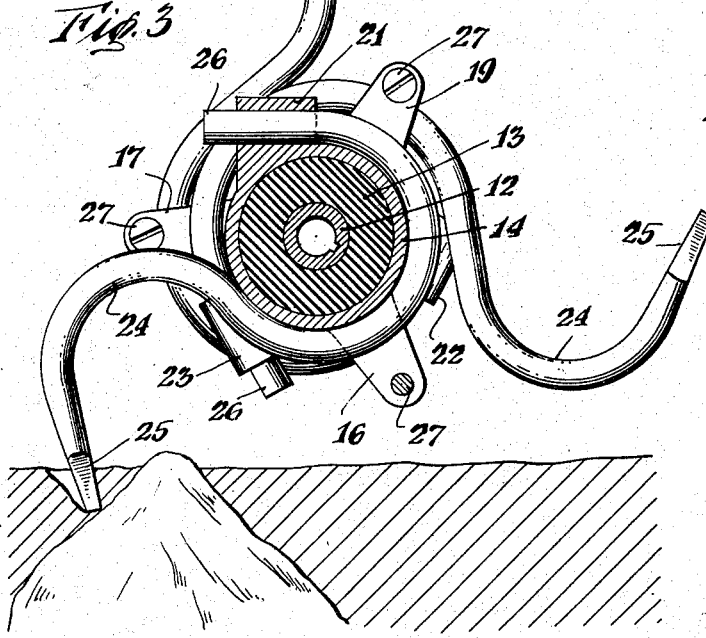
Fig. 3 is a cross section taken along the lines 3—3 in Fig. 2 looking in the direction of the arrows.
Figure 4:
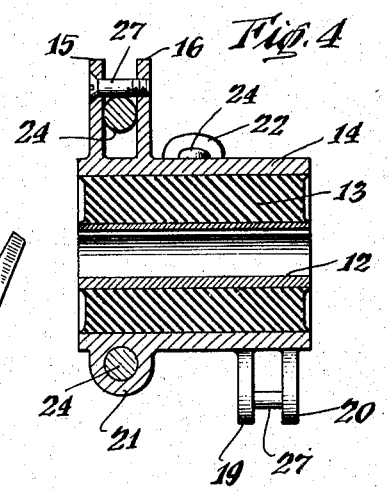
Fig. 4 is a cross section taken along the lines 4—4 of Fig. 1 again looking in the direction of the arrows.

With the tine assembly in position on a rotary tilling machine, the rotation of the assembly, as illustrated in Fig. 1, would be counter-clockwise. Accordingly, and as the entering edges 25 of the tine strike the soil, the first reaction of the tines, as resistance to movement is encountered, is to coil themselves about the sleeve. Because of the dimensions of the parts, this coiling of the tine about the sleeve 14 is a gradual winding up of the tine from the point of contact with the sleeve at 28 until the whole inner curve of the tine is in contact with the surface of the sleeve. The fact that the point of initial winding strain 28 is on the surface of the sleeve permits the force opposing the tine to be dissipated gradually through the winding operation rather than have it concentrated at the point where the tine is held in its socket. The fact that the tines are made of spring steel imparts a resiliency to them and aids in the absorption of considerable strain during this winding operation thus materially reducing breakage. Moreover, it will be apparent that the inner convolution of the tine is subjected only to slight bending stresses as it is pushed against the sleeve 14 and, after any portion thereof contacts the surface of the sleeve, the stress in that portion is substantially entirely tension. Thus, between the socket and the point of reverse curvature the tine is subjected substantially only to tensile stress because all of this portion of the tine may wind about the sleeve without bending to any appreciable degree. This substantially reduces the effective length of the lever arm with which pressure on the point acts to bend the tine backward and is a very substantial advantage. If, as is shown in Fig. 3, a tine should encounter a rock, as indicated, or other obstacle during its course of travel through the soil, the initial period of spring compression on the part of the tine will be followed by a lifting of the entire tine assembly vertically over the obstruction. It must be pointed out, in addition, that the resilient coupling provided by the rubber sleeve 13, also plays its part in absorbing shock and stress during the operation of the tine assembly as this member is placed under twisting compression when increased resistance to the free rotation of the tine is encountered. In the modification shown in Fig. 5, a drive shaft 30, provided with a key-way 31, is adapted to receive a plurality of sleeve members 32 which may be of any desirable number and to each of which is secured a ring of rubber 33, which is bonded to the metal band in accordance with well-known practice. The sleeves 32 are provided with abutting shoulders 34 adjacent the shaft, and with spaced shoulders 35 and 36 at either side of the rubber ring or collar 33. A final metallic band 37 is bonded to the rubber collar at its outer periphery and carries lug or finger members 38 and a socket portion 39 of the same type heretofore described in connection with Figs. 1 through 4. A tine member 40 is placed in position in the socket and between the two lug or finger members as heretofore described and a bolt or clevis pin 41 bridging the lug or finger members above the tine holds the latter in place.

In operation, and as has been shown in Fig. 5, a plurality of these tine mounts are placed on a single shaft. As the shaft is rotated, and the tines are carried through the earth, resistance in the direction of their path of travel is cushioned and absorbed by a coiling of the tines about the outer sleeve or ring, in the same manner as previously described in connection with the modification shown in Figs. 1 through 4. In addition to this type of shock absorption, it will be noted that sidewise thrusts result not only in a partial displacement of the tines but also in the tine holders to the limit permitted by the shoulders 35 and 36 due to the presence of the resilient rubber ring 33. When the shoulders come together as is shown at 42, their sidewise movement is terminated, thus permitting flexibility well within the limit of the resilient characteristics of the rubber rings or collars. In the modification shown in Figs. 6 and 7, a tine assembly is disclosed in which the drive shaft 43 is keyed at 44 to a hub or an all-metal tine mount comprising spokes 45 and an outer band 46. As has been shown, the spoke members 45 may be of staggered design spaced longitudinally along the shaft, it being important to keep the weight of the structure as light as possible consistent with the strength necessary to do the job. The outer band, or ring 46, carries the spaced lug or finger members 47 and the socket members 48 of the same type as has been described in connection with the previous modifications, and bolts or clevis pins 49 are utilized to cooperate with the ends of the lug or finger members to hold the tines in position once they have been inserted in the sockets and through the lug or finger members.

Referring now to Figs. 8, 9 and 10, there is shown a driven shaft 50 adapted to be coupled to a source of power and provided with a key-way extending longitudinally thereof and into which is fitted a key 51 in accordance with well-known practice. A sleeve 52 encircles said shaft and is likewise provided with a complementary key-way which accommodates the projecting portion of the key 51. This sleeve which is formed of metal has an outwardly extending lug or arm 53 formed on its outer surface for a purpose hereinafter brought out. An additional sleeve 55 is also provided and which may, as has been shown, be formed with an internal shoulder 55a to accommodate one edge of the sleeve 52. This latter sleeve has secured to its outer surface a ring or band of rubber or other resilient material 56 which may be vulcanized or otherwise secured thereto. Encircling said rubber ring or band is an outer sleeve of metal 57 to which may be welded or otherwise secured a tine receiving socket 58 and spaced tine accommodating lugs 59 and 59a which carry a clevis pin 60 for holding the tine 61 in assembled position. As shown in Figs. 9 and 10, any number of sleeves may be positioned on a single shaft 50 and they may all be secured one to the other by means of bolts 54 extending longitudinally of the shaft and passing through holes in each of the sleeve sections 52 and 55. In operation, the tine 61 carried by the sleeve 57 is resiliently driven by the shaft 52 through the intermediary of the rubber ring or band 56. Upon striking an obstacle, the elasticity and resiliency of the rubber ring permits relative rotation of the sleeve 52 with respect to the sleeve 57. The latter is provided with projections 62 and 63 extending beyond one side edge of the sleeve to either side of the lug or arm 53 carried by the sleeve 52 and in the path of such lug. Accordingly, relative rotation of the sleeve 57 with respect to the sleeve 52 and the shaft 50 is limited by the clearance between the lug 53 and the projections 62 and 63. Should the tine strike an obstacle which holds it firmly, the shaft can only continue rotating until such time as the lug 53 has been projected against the stop 62, and thereafter further compression of the rubber ring or band is prevented. On release of the obstacle holding the tine from rotation, a sudden rebound or springing of the tine and the sleeve 57 in the opposite direction is limited by the further stop 63 which cooperating with the lug 52 prevents the parts from going beyond the elastic limits of the rubber. By properly positioning the lug and the two stop members and by a predetermination of the distances between the parts, a tine holder can be evolved which will permit ready flexibility and resilience during ordinary operating conditions, but in which it is impossible to overload the rubber ring member beyond its ability to distort. The provision of positive contact between the lug 52 and the stops 62 and 63 permits transmission of the driving force or the rebound from one sleeve to another directly through the positive engagement of these parts, taking all strain beyond that point away from the rubber ring or band.

It will be apparent that the structure shown in Figs. 9 and 10 will permit as many tine carrying sleeves to be positioned along a single driven shaft as is necessary to get a cultivating width suitable for the use to which the machine is about to be put and at the same time each such tine holder functions completely independently of the others.

Turning next to Figs. 11 and 12, there is shown a driven shaft 64 provided with a longitudinally extending key-way in which is positioned a key 65 which, in turn, cooperates with a corresponding key-way in a sleeve 66 encircling said shaft. The latter, preferably square in cross section, is provided with opposed socket portions 67 having undercut side walls 67a and 67b. Cooperating therewith are wedge shaped metal members 68 to which are secured by vulcanization or otherwise, rubber blocks 69, each of which carries an additional wedge-shaped metal member vulcanized to its outer surface as at 70. This latter member is received by a complementary socket portion 70' in an outer ring 74, and bolts 72 carried by the ring adjacent the socket portion 75, are inserted after the wedge-shaped members 70 are placed in position so that the heads of the bolts 72 overlie the outer edge of such wedge-shaped members and prevent their accidental displacement. In the same manner, additional bolts 71 carried by the sleeve 66 overlie adjacent corners of the wedge-shaped members 68. The band or ring 74 is provided with internal recesses 75 which cooperate with projections or flanges 73 carried by the sleeve 66. In addition, the ring 74 carries spaced time receiving lugs 76 and 76a provided with openings 77 and 77a through which a clevis pin (not illustrated) is positioned to hold a tine (also not illustrated) in position, all as shown in the preceding views. Socket member 78 is also provided to receive the end of such tine. In operation, shaft 64 is rotated carrying the tine assembly with it, and upon the tine's striking an obstacle, the rubber blocks 69 are distorted due to relative rotation between the sleeve 66 and the ring 74, until such time as the projections or lugs 73 abut against the side walls of the recesses 75, from which point onward all strain of the parts is transmitted directly from the sleeve to the ring through the contact of the metal parts and further compression or strain on the rubber block members is avoided. Rebound or recoil is also provided for by permitting the lugs or projections 73 to strike against the opposite walls of the recesses 75 in such a contingency.

In Fig. 13, which is a fragmentary section of the structure shown in Figs. 11 and 12, there is substituted for the wedge-shaped element 68, a screw-threaded metal block 79 to which is vulcanized a rubber block 80. The screw-threaded block fits into a complementary screw-threaded socket 79a carried by the sleeve 66 and the opposite end of the block 80 has a further metal element 81 carrying an internally threaded recess into which the bolt 82 is secured for holding the parts in position with respect to the sleeve and the ring 74. Otherwise, the structure is the same as has been described in connection with Figs. 11 and 12.

In Fig. 14 a driven shaft 83 is present having a key-way in which a cooperating key member 84 is inserted and which, in turn, keys the shaft to a sleeve or spider 85. The latter has spaced projecting lugs 86 provided with shoulders 86a at the outer extremities thereof and shoulders 86b spaced along such projections nearer the sleeve 85. Rubber blocks 87 provided with central recesses are passed over the head portion 86a of the lugs 86 and are caused to rest between the shoulders 86a and 86b. The outer edges of such rubber blocks, in turn, bear against the parallel internally extending walls 89 and 90 of an outer ring 88. The latter member has a tine receiving socket 91 secured to its outer surface by welding or the like and lugs 92 and 92a for receiving such tine with a clevis pin opening 93 for locking the tine in its assembled position. In this embodiment when the shaft is rotated, the internal sleeve transmits motion of the rotating shaft through the rubber blocks to the outer ring, thus carrying the tine with it. When the tine meets an obstruction, compression of that side of the rubber block in the path of travel of the projections 86 occurs, thus absorbing the shock, but in this instance no positive stop or limit is needed, as the limit of compressibility of the rubber block will be sufficient.

Likewise, as has been shown in Fig. 15, a driven shaft 94, provided with a key 95 accommodated in its longitudinally extending key-way, is secured to a sleeve 96, and projecting lug portions 97 are fitted with enlarged ball head portions 98 which, in turn, cooperate with metallic socket portions 99 vulcanized or otherwize embedded in rubber blocks 100. The latter cooperate with the outer sleeve 101 and bear against the parallel side walls of 102 and 103 of internal sockets formed in such sleeve, the latter having, in common with the structures heretofore described, a tine socket 104 with an internal bore 105 and tine receiving lug members 106 and 106a formed with a clevis pin opening 107. Here, as in the case of the structure shown in Fig. 14, rotation of the driven shaft causes the sleeve 96 and the arm carried thereby to rotate and power is transmitted through the rubber block to the outer sleeve 101 and thus to the tine. Again, an obstacle in the path of the tine will simply cause the rubber block to be compressed in the path of travel of the shaft until the limit of their compressibility is reached, from which time onward there will be again established a direct drive from the shaft through the tine. The interval, however, incident to the compression of the rubber block is sufficient to break the direct force of any blow of a tine against an immovable obstacle, and will be sufficient to prevent undue strain or damage to the parts in actual operation.

It will be noted that in each of the foregoing modifications described, stress and strain on the tine members is not concentrated at any one point, but is allowed to build up gradually through the body of the tine, as compression, due to the meeting of an obstacle, is encountered. This results in the greatly increased life in the tines themselves, as well as throughout the entire machine. It is also to be appreciated that many changes in design and re-arrangements in the parts might be resorted to in the construction of a tine assembly without in the slightest departing from the scope of my invention as heretofore described.

I claim:

1. A rotary tillage device of the class described comprising a driven shaft, a tool mounting sleeve encircling said shaft and drivingly connected thereto, tool engaging means on said sleeve, a spring tool having a portion adjacent one end thereof curved through an arc of substantial length with said one end withdrawably engaged by said means and said curved portion coiled around said sleeve in close but gradually increasing spaced relation thereto from said end; whereby, pressure on the other end of said tool tending progressively to force said loop into contact with said sleeve from said one end will wind it tightly therearound; and detachable means secured to said sleeve for limiting the distance which said curved portion may move away from said sleeve; the detachment of said last mentioned means permitting said tool to be readily withdrawn from said tool engaging means.

2. A rotary tillage device of the class described comprising a driven shaft, a tool mounting sleeve encircling said shaft, resilient means positioned between said shaft and said sleeve and drivingly connecting said sleeve to said shaft, tool engaging means on said sleeve, a spring tool having a portion adjacent one end thereof curved through an arc of substantial length with said one end withdrawably engaged by said means and said curved portion coiled around said sleeve in close but gradually increasing spaced relation thereto from said end; whereby, pressure on the other end of said tool tending progressively to force said loop into contact with said sleeve from said one end will wind it tightly therearound, and detachable means secured to said sleeve and cooperating with said tool for limiting the distance which said curved portion may move away from said sleeve; the detachment of said last mentioned means permitting said tool to be readily withdrawn from said tool engaging means.

3. A rotary tillage device of the class described comprising a driven shaft, a tool mounting sleeve encircling said shaft and drivingly connected thereto, tool engaging means on said sleeve, a spring tool having a portion adjacent one end thereof curved through an arc of substantial length with said one end withdrawably engaged by said means and said curved portion coiled around said sleeve in close but gradually increasing spaced relation thereto from said end; whereby, pressure on the other end of said tool tending progressively to force said loop into contact with said sleeve from said one end will wind it tightly therearound; and means overlying said curved portion and detachably secured to said sleeve at a point remote from said tool engaging means for retaining said tool in engagement with said last mentioned means and also for limiting the distance which said curved portion may move away from said sleeve.

4. A rotary tillage device of the class described comprising a driven shaft, a tool mounting sleeve provided with a tool receiving socket thereon, encircling said shaft and drivingly connected thereto, a spring tool having a portion adjacent one end thereof curved through an arc of substantial length with said one end withdrawably positioned in said socket and having said curved portion coiled about said sleeve in increasingly spaced relation thereto from a point of approximate tangency therewith at said socket; whereby, pressure on the opposite end of said shaft tending progressively to force said tool against said sleeve from said point will wind it tightly therearound; and means detachably secured to said sleeve and overlying said tool at a point approximately diametrically opposite said socket for maintaining said tool in said socket; the detachment of said means permitting said tool to be readily withdrawn from said socket for replacement.

5. A rotary tillage device of the class described comprising a first sleeve adapted to be secured to a driven shaft, a second sleeve surrounding said first sleeve, resilient means positioned between said sleeves and operatively connecting said sleeves together so that rotation of said first sleeve will drive said second sleeve through said resilient means, a plurality of tool receiving sockets circumferentially spaced about the exterior of said second sleeve; each being positioned and adapted to receive one end of a resilient tool having that portion thereof adjacent said end coiled about said shaft in close proximity but in increasingly spaced relation thereto from said socket; whereby, pressure on the opposite end of a tool tending progressively to force said coiled portion thereof against said sleeve from a point adjacent its socket will wind it tightly about said sleeve; and a plurality of detachable means secured to said sleeve and disposed in circumferentially spaced relation to said sockets, each adapted to overlie and prevent a tool positioned in one of said sockets from being withdrawn therefrom; the detachment of any of said means permitting the underlying tool to be readily withdrawn from its socket.

CADWALLADER W. KELSEY.